(12) United States Patent
Anderl et al.

(10) Patent No.: US 10,982,907 B2
(45) Date of Patent: *Apr. 20, 2021

(54) DEMAND-BASED CHARGING OF A HEAT PIPE

(71) Applicant: International Business Machines Corporation, Armonk, NY (US)

(72) Inventors: William J. Anderl, Rochester, MN (US); Bret P. Elison, Rochester, MN (US); Phillip V. Mann, Rochester, MN (US); Arvind K. Sinha, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/813,143

(22) Filed: Nov. 14, 2017

(65) Prior Publication Data

US 2018/0080720 A1 Mar. 22, 2018

Related U.S. Application Data

(63) Continuation of application No. 14/881,393, filed on Oct. 13, 2015, now Pat. No. 9,835,384.

(51) Int. Cl.
*F28D 15/06* (2006.01)
*F28D 15/02* (2006.01)
(Continued)

(52) U.S. Cl.
CPC ............ *F28D 15/06* (2013.01); *F16K 31/002* (2013.01); *F28D 15/0275* (2013.01); *F28F 3/02* (2013.01);
(Continued)

(58) Field of Classification Search
CPC ...... F28D 15/06; F28D 15/0275; F28F 13/00; F16K 31/002
(Continued)

(56) References Cited

U.S. PATENT DOCUMENTS 3,414,050 A 12/1968 Anand
3,563,309 A 2/1971 Basiulis
(Continued)

FOREIGN PATENT DOCUMENTS

GB 1392740 A 4/1975
JP 2005180802 A 7/2005
(Continued)

OTHER PUBLICATIONS

Translation of Japanese Patent Document JP2006013408A entitled Translation—JP2006013408A (Year: 2019).*
(Continued)

*Primary Examiner* — Paul Alvare
(74) *Attorney, Agent, or Firm* — Martin & Associates, LLC; Derek P. Martin

(57) ABSTRACT

A heat pipe includes one or more reservoirs of liquid that are closed at lower temperatures and open at higher temperatures. The opening of the reservoirs at higher temperatures caused by higher power levels dynamically increases the amount of liquid in the heat pipe, which increases performance of the heat pipe at higher power levels. As the heat pipe cools, the liquid condenses and flows back into the reservoirs. As the heat pipe continues to cool, the reservoirs close. The result is a heat pipe that is more efficient at lower power levels and still maintains high efficiency at higher power levels due to the demand-based charging of the liquid based on temperature.

17 Claims, 5 Drawing Sheets

(51) Int. Cl.
*F28F 3/02* (2006.01)
*F16K 31/00* (2006.01)

(52) U.S. Cl.
CPC .. *F28D 15/0283* (2013.01); *F28D 2015/0216* (2013.01)

(58) Field of Classification Search
USPC ............. 165/104.26, 272, 274, 275, 140
See application file for complete search history.

(56) References Cited

U.S. PATENT DOCUMENTS

| | | | |
|---|---|---|---|
| 3,741,289 | A | 6/1973 | Moore |
| 3,818,980 | A | 6/1974 | Moore, Jr. |
| 4,026,348 | A | 5/1977 | Roberts, Jr. |
| 4,137,964 | A * | 2/1979 | Buckley ............... F24F 5/0046 165/287 |
| 4,377,198 | A | 3/1983 | Welling et al. |
| 5,159,972 | A * | 11/1992 | Gunnerson ........... F24F 12/002 165/104.21 |
| 5,667,003 | A | 9/1997 | Mahdjuri-Sabet |
| 5,816,313 | A | 10/1998 | Baker |
| 6,810,946 | B2 | 11/2004 | Hoang |
| 6,981,543 | B2 | 1/2006 | Chesser et al. |
| 7,004,240 | B1 | 2/2006 | Kroliczek et al. |
| 7,431,071 | B2 * | 10/2008 | Wenger ............... F28D 15/0266 165/104.26 |
| 7,549,461 | B2 | 6/2009 | Kroliczek et al. |
| 8,109,325 | B2 | 2/2012 | Kroliczek et al. |
| 2001/0037880 | A1 * | 11/2001 | Solondz ............... F28D 15/06 165/274 |
| 2003/0051857 | A1 | 3/2003 | Cluzet et al. |
| 2003/0192686 | A1 | 10/2003 | Hisai et al. |
| 2004/0254532 | A1 | 12/2004 | Mehier |
| 2005/0092481 | A1 | 5/2005 | Wyatt et al. |
| 2006/0162903 | A1 | 7/2006 | Bhatti et al. |
| 2010/0051240 | A1 | 3/2010 | Ipposhi et al. |
| 2010/0051254 | A1 | 3/2010 | Ipposhi et al. |
| 2010/0221627 | A1 | 9/2010 | Nakakubo |
| 2011/0056657 | A1 | 3/2011 | Lin et al. |
| 2012/0048519 | A1 | 3/2012 | Gruss et al. |
| 2013/0042636 | A1 * | 2/2013 | Shabany ............... H01L 23/427 62/79 |
| 2013/0228313 | A1 | 9/2013 | Fried |
| 2015/0114607 | A1 * | 4/2015 | Moscatelli ............ F28D 15/043 165/104.26 |

FOREIGN PATENT DOCUMENTS

| | | | | |
|---|---|---|---|---|
| JP | 2006013408 | A * | 1/2006 | ......... F28D 15/0266 |
| JP | 2006013408 | A | 1/2006 | |
| JP | 2011069546 | A | 9/2009 | |

OTHER PUBLICATIONS

English Translation of Japanese Patent Document JP2011069546, Sep. 25, 2009.
English translation of Japanese Patent Document JP 2006013408 A, Jul. 20, 2017.
Anderl et al., "Demand-Based Charging of a Heat Pipe" U.S. Appl. No. 14/881,413, filed Oct. 13, 2015.
Anderl et al., "Demand-Based Charging of a Heat Pipe" U.S. Appl. No. 14/881,393, filed Oct. 13, 2015.
Anderl et al., "Demand-Based Charging of a Heat Pipe" U.S. Appl. No. 15/044,375, filed Feb. 16, 2016.
Anderl et al., "Demand-Based Charging of a Heat Pipe" U.S. Appl. No. 15/044,594, filed Feb. 16, 2016.
Anderl et al., "Demand-Based Charging of a Heat Pipe" U.S. Appl. No. 15/814,371, filed Nov. 15, 2017.
Appendix P—List of IBM Patents or Patent Applications Treated as Related, dated Dec. 1, 2017.

* cited by examiner

DEMAND-BASED CHARGING OF A HEAT PIPE

BACKGROUND

1. Technical Field

This disclosure generally relates to heat pipes, and more specifically relates to a heat pipe that includes one or more reservoirs that provide demand-based charging.

2. Background Art

A heat pipe is used to transfer heat between a hot interface and a cold interface. The heat pipe includes a liquid in contact with a thermally conductive solid surface at the hot interface. When the hot interface heats up, the liquid turns into a vapor by absorbing heat from the hot interface. The vapor then travels along the heat pipe to the cold interface and condenses back into liquid, which releases the latent heat. The liquid then returns to the hot interface, and the cycle repeats. Heat pipes are highly effective thermal conductors, with an effective thermal conductivity orders of magnitude larger than for other heat transfer methods, such as a solid metal like copper.

Heat pipes are charged with a liquid. The amount of liquid in the heat pipe determines the performance of the heat pipe. As the rate of heat energy absorbed by the heat pipe increases, there is a possibility all of the liquid will turn to vapor. At this point, the temperature of the vapor within the pipe will begin to rapidly increase. As a result, the thermal resistance of the heat pipe increases exponentially. Consequently, most known heat pipes are usually overcharged or saturated with the liquid to avoid the increase of thermal resistance caused by turning all of the liquid into vapor. However, at lower heat energy rates, the performance of heat pipes that are overcharged or saturated is less than heat pipes that are charged with less liquid.

Heat pipes are commonly used in heat sinks for modern electronics, such as processors. To assure the heat sinks work properly when the processor is functioning at high power, the heat pipes in heat sinks are typically overcharged or saturated with liquid. This same heat pipe will work less efficiently at a lower power, meaning the temperature of the processor will be higher than if a heat pipe that were less charged with liquid were used. Thus, the designer of a heat sink that uses a heat pipe must make a tradeoff between performance of the heat sink at lower powers and performance of the heat sink at higher powers. Because excessively high temperatures can cause a catastrophic failure in a processor, the decision is usually made to overcharge or saturate the heat pipes in a processor heat sink so they can handle maximum processor power.

SUMMARY

A heat pipe includes one or more reservoirs of liquid that are closed at lower temperatures and open at higher temperatures. The opening of the reservoirs at higher temperatures caused by higher power levels dynamically increases the amount of liquid in the heat pipe, which increases performance of the heat pipe at higher power levels. As the heat pipe cools, the liquid condenses and flows back into the reservoirs. As the heat pipe continues to cool, the reservoirs close. The result is a heat pipe that is more efficient at lower power levels and still maintains high efficiency at higher power levels due to the demand-based charging of the liquid based on temperature.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

DETAILED DESCRIPTION

The disclosure and claims herein relate to a heat pipe that includes one or more reservoirs of liquid that are closed at lower temperatures and open at higher temperatures. The opening of the reservoirs at higher temperatures caused by higher power levels dynamically increases the amount of liquid in the heat pipe, which increases performance of the heat pipe at higher power levels. As the heat pipe cools, the liquid condenses and flows back into the reservoirs. As the heat pipe continues to cool, the reservoirs close. The result is a heat pipe that is more efficient at lower power levels and still maintains high efficiency at higher power levels due to the demand-based charging of the liquid based on temperature.

Figure 1:
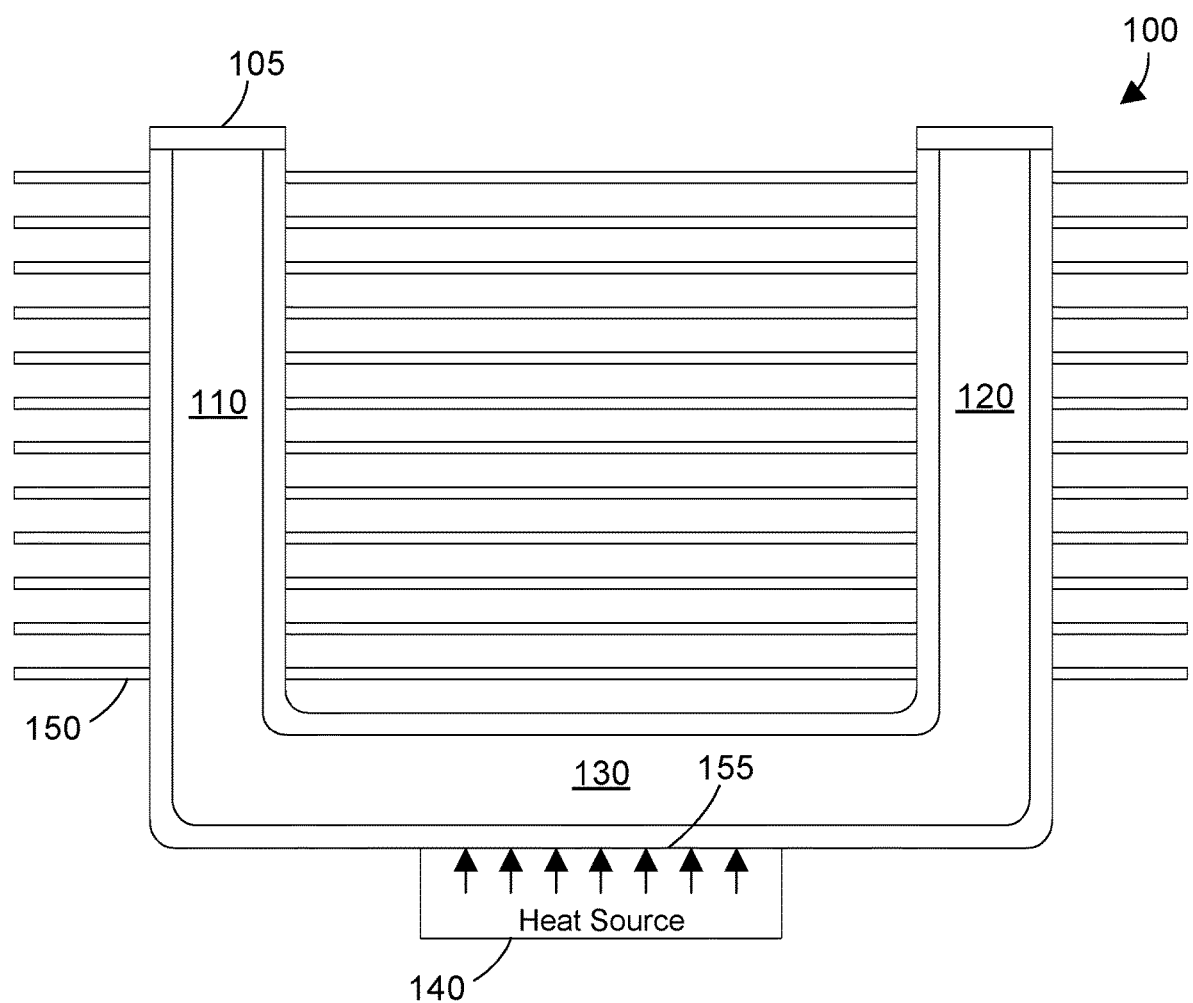
FIG. 1 is a block diagram of a heat sink that includes a heat pipe.

Referring to FIG. 1, a heat sink 100 is shown that includes a heat pipe 105 in a U-shape with vertical portions 110 and 120 coupled to a common horizontal portion 130. The horizontal portion 130 is charged with a first quantity of a liquid. The heat sink 100 includes an interface 155 on the bottom surface of horizontal portion 130 that thermally couples a heat source 140 to the heat pipe 105 to transfer heat away from the heat source 140. One example of a heat source is an integrated circuit, such as a processor. The heat sink 100 includes multiple fins 150 as known in the art that help dissipate heat in the heat pipe 105.

Figure 2:
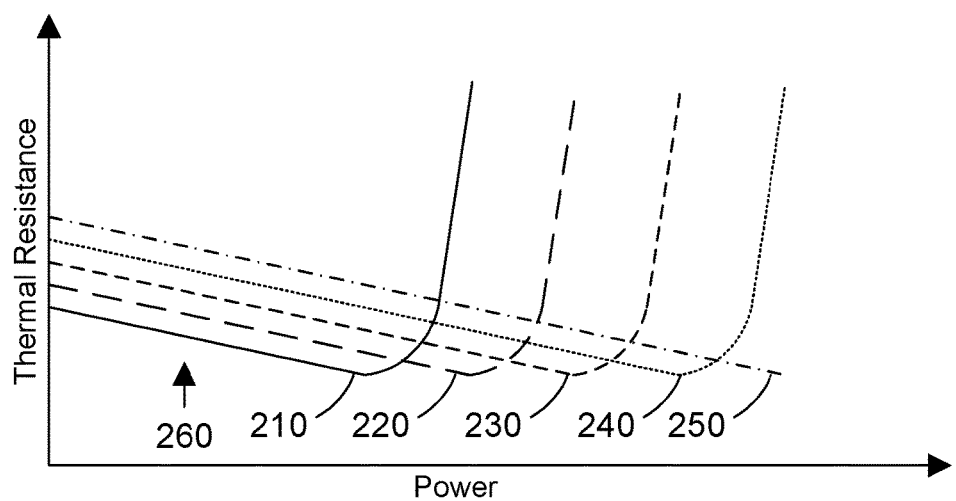
FIG. 2 is a graph showing thermal resistance as a function of power for the heat sink in FIG. 1 based on different levels of liquid in the heat pipe.

Performance of the heat sink 100 is shown graphically in FIG. 2, with thermal resistance of the heat sink plotted as a function of power for various levels of liquid charging in the heat pipe. Note that heat sink 100 shown in FIG. 1 in the prior art would typically be charged with a fixed level of liquid during manufacture then sealed, which means that known heat sinks have a performance defined by their fixed liquid charge. FIG. 2 shows multiple lines that each represents performance of a heat sink such as heat sink 100 with a different charge of liquid. Line 210 shows performance of the heat sink 100 when the heat pipe 105 has a very low charge of liquid. Line 220 shows performance of the heat sink 100 when the heat pipe 105 has a low charge of liquid. Line 230 shows performance of the heat sink 100 when the heat pipe 105 has a nominal charge of liquid. Line 240 shows performance of the heat sink 100 when the heat pipe 105 has an overcharge of liquid. And line 250 shows performance of the heat sink 100 when the heat pipe 105 is saturated with liquid. At a lower power shown in FIG. 2 at 260, the thermal resistance of the heat pipe with lesser liquid charges is less than the thermal resistance of the heat pipe with greater liquid charges. But the lesser liquid charges increase in thermal resistance at significantly lower power than for greater liquid charges. FIG. 2 shows graphically why most manufacturers of heat sinks that use heat pipes use an overcharge of liquid or saturation of liquid in the heat pipes, since higher powers can lead to catastrophic failure in integrated circuits, and heat pipes with an overcharge of saturation of liquid will operate at much higher powers without a significant increase of thermal resistance.

Figure 3:
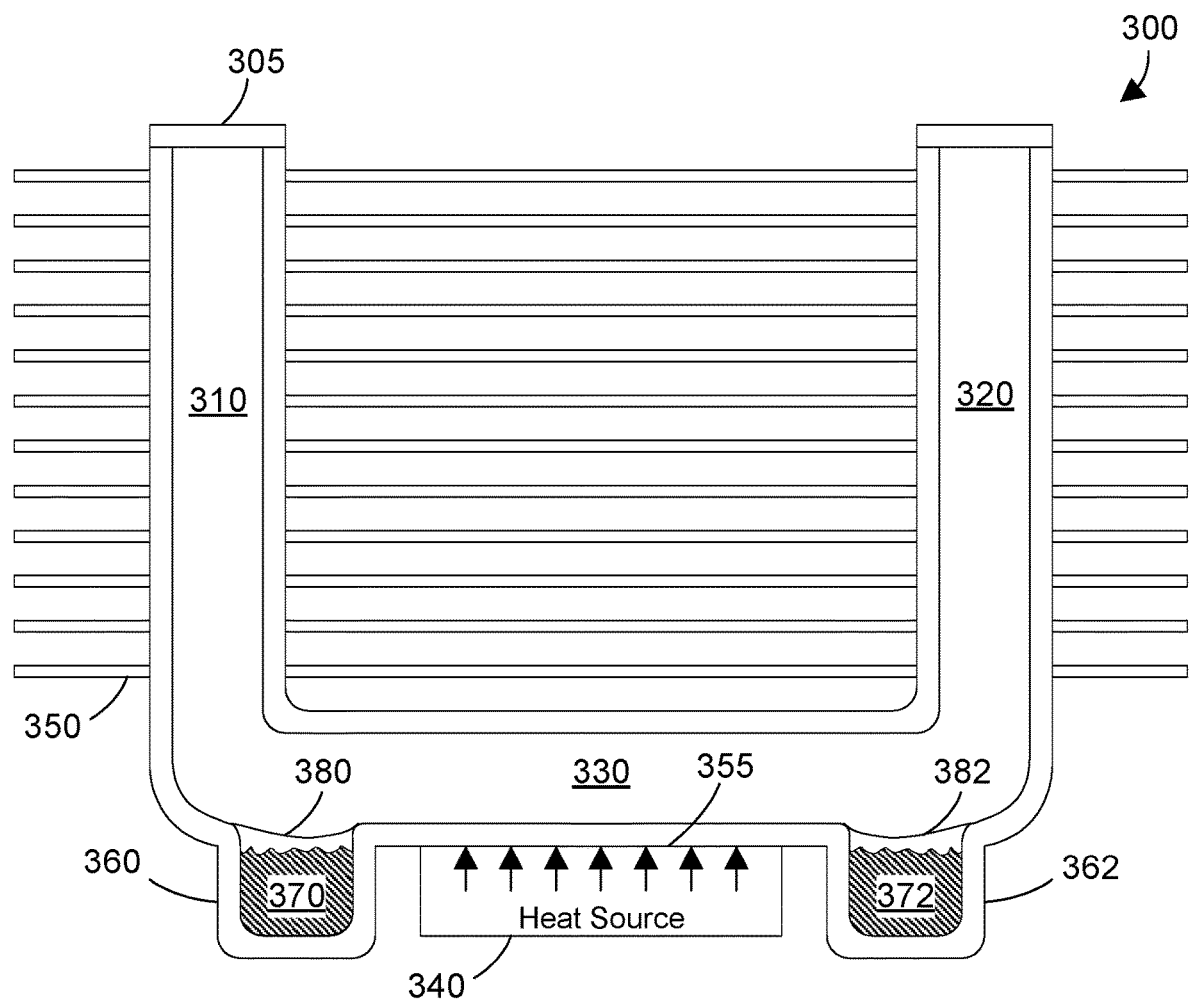
FIG. 3 is a block diagram of a heat sink that includes a heat pipe that has reservoirs of liquid that are closed.

An improved heat sink 300 is shown in FIG. 3, which includes a heat pipe 305 in a U-shape with vertical portions 310 and 320 coupled to a common substantially horizontal portion 330. The heat pipe 305 includes an interface 355 on the bottom surface of the substantially horizontal portion 330 that thermally couples a heat source 340 to the heat pipe 305 to transfer heat away from the heat source 340. Heat source 340 could be an integrated circuit, such as a processor. In the most preferred implementation, the substantially horizontal portion 330 overlies the interface 355 and is charged with a first quantity of a liquid. The heat sink 300 includes multiple fins 350 that are thermally coupled to the heat pipe to help dissipate heat in the heat pipe 305.

Figure 4:
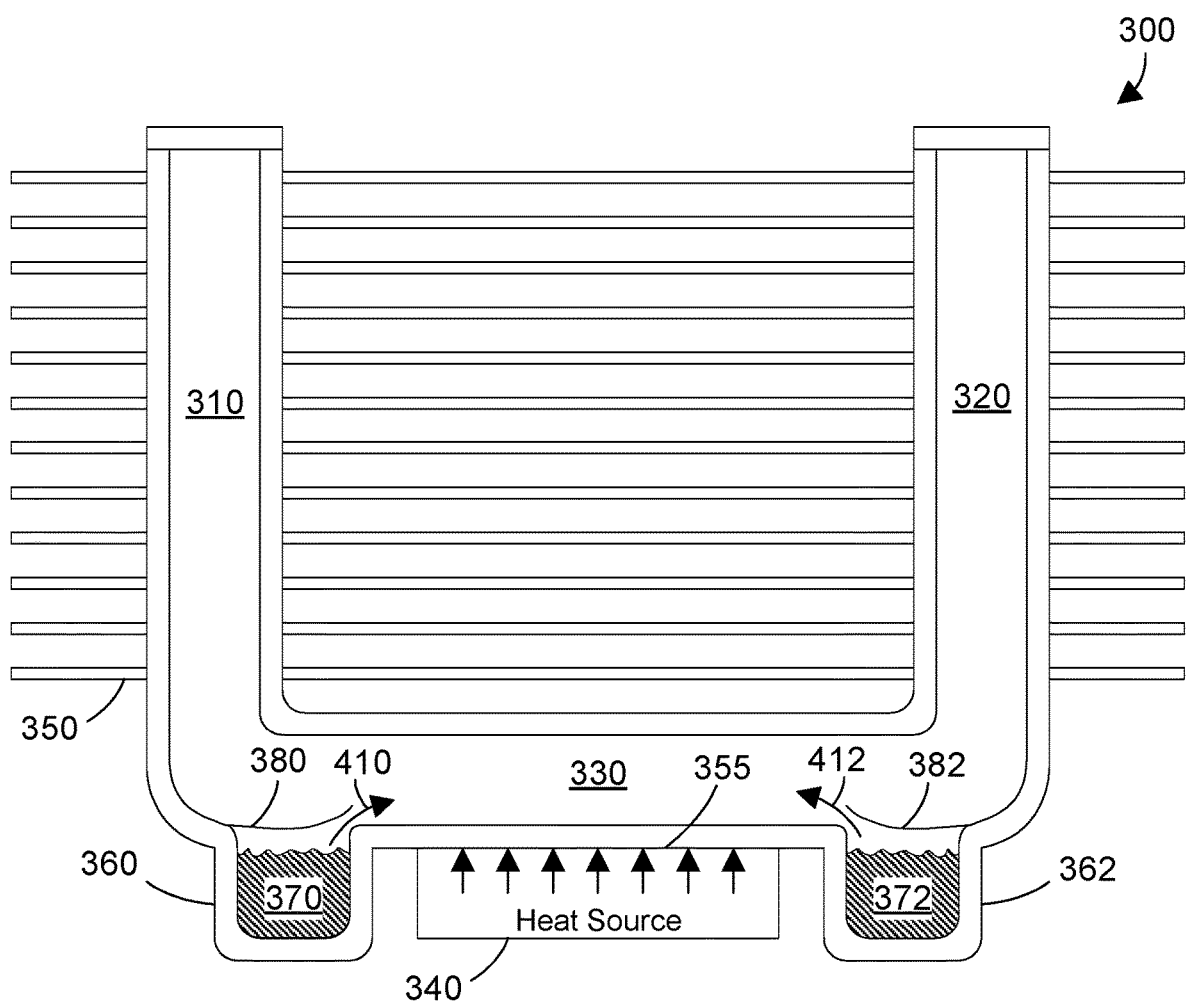
FIG. 4 is a block diagram of the heat sink in FIG. 3 with reservoirs of liquid that are open when all the liquid within the pipe has turned to vapor and temperature is rising, which increases the liquid charging of the heat pipe dynamically as the temperature increases.

Heat pipe 305 includes reservoirs 360 and 362 in the lower portion of the substantially horizontal portion 330. Reservoirs 360 and 362 are preferably each charged with a second quantity of liquid 370 and 372. Each reservoir 360 and 362 has a corresponding temperature-actuated valve 380 and 382, respectively, that each has an actuation temperature. When the temperature is below the actuation temperature of the temperature-actuated valves 380 and 382, the valves seal the liquid in the reservoirs 360 and 362, as shown in FIG. 3, which means the second quantities of the liquid 370 and 372 in the reservoirs 360 and 362, respectively, is isolated from the first quantity of the liquid in the substantially horizontal portion 330. When the temperature is above the actuation temperature of the temperature-actuated valves 380 and 382, the valves are open, as shown in FIG. 4, which means the second quantity of liquid 370 and 372 in the reservoirs 360 and 362, respectively, may now enter the substantially horizontal portion 330, as shown by arrows 410 and 412 in FIG. 4. The second quantity of liquid in each of reservoirs 370 and 372 preferably combine with the first quantity of liquid in the substantially horizontal portion 330, resulting in total liquid that is equal to the sum of the first quantity and the two second quantities. As the temperature in the heat pipe decreases, the liquid will condense and run by the force of gravity back into the reservoirs 360 and 362. In the most preferred implementation, each reservoir at least partially underlies a vertical portion, as shown in FIG. 3 by reservoir 360 underlying a portion of vertical portion 310 and by reservoir 362 underlying a portion of vertical portion 320. This is desirable because the condensation occurs in the upper portion of the vertical portions 310 and 320, which means the condensed liquid will run down the sides of the vertical portions 310 and 320 into the reservoirs 360 and 362. Once the temperature decreases to the actuation temperature of the temperature-actuated valves 380 and 382, the valves 380 and 382 close, as shown in FIG. 3, once again sealing the liquid 370 and 372 in the reservoirs 360 and 362, respectively.

One suitable example of temperature-actuated valves 380 and 382 are bi-metal valves. Bi-metal valves are a composite layer made by bonding together two materials with different thermal expansion coefficients. As the one material with the greater thermal expansion coefficient expands more upon heating than the other, the composite layer generates a temperature-dependent deformation of the bi-metallic valve. For the examples in FIGS. 3 and 4, we assume the exterior ends (farthest to the outside) of valves 380 and 382 are attached to the edge of the reservoir, leaving the opposing interior portions of valves 380 and 382 to deform, and thus open as shown in FIG. 4 and close as shown in FIG. 3. The opposing edge, or the entire opening of the reservoir, could include a valve seat the bi-metallic valve rests on when the temperature is below the actuation temperature. The valve seat assures a tight seal when the valves 380 and 382 are closed so the liquid 370 and 372, respectively, is sealed in respective reservoirs 360 and 362. Bi-metal valves are well-known in the art, and thus are not discussed in more detail here. Various materials can be used for the bi-metal valves depending on the desired actuation temperature, depending on the amount of opening desired when the actuation temperature is reached, and depending on the liquid being used. The disclosure and claims herein expressly extend to the use of any temperature-actuated valve, whether currently known or developed in the future.

Figure 5:
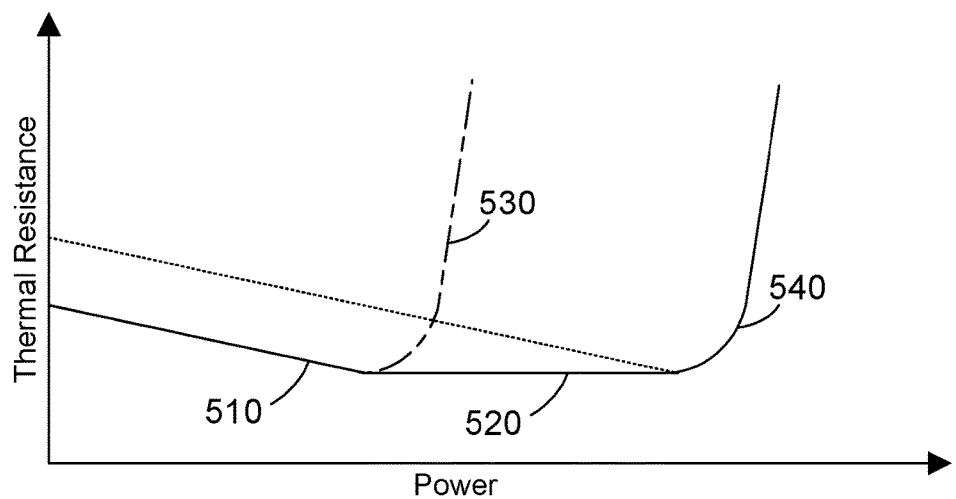
FIG. 5 is a graph showing thermal resistance as a function of power for the heat sink in FIGS. 3 and 4.

By providing a heat sink with a heat pipe that includes one or more reservoirs as shown in FIGS. 3 and 4, the performance of the heat pipe increases due to the dynamic charging of liquid into the heap pipe as the power rises. A graph of the performance of the heat sink 300 shown in FIGS. 3 and 4 is shown in FIG. 5. This example assumes the reservoirs are filled with liquid during manufacture of the heat sink, and the substantially horizontal portion 330 of the heat pipe otherwise has a very low charge of liquid besides the liquid in the reservoirs. The linear portion 510 in FIG. 5 is the same as the linear portion of line 210 in FIG. 2. We assume, however, that at a temperature just before the bend in the line 530 that shows an increase in thermal resistance for a very lightly charged heat pipe, the valves 380 and 382 open. With the valves opened, the amount of liquid in the heat pipe increases. This is why the heat pipe herein has dynamic charging of liquid. The performance at portion 520 in FIG. 5 is linear with power until a sufficient power is reached that the thermal resistance increases dramatically, as shown at 540. Note that 540 corresponds to the upper portion of line 240 in FIG. 2. Comparing the performance in FIG. 5 to the performance in FIG. 2 shows the performance of the heat sink 300 in FIGS. 3 and 4 is optimized across all operating temperatures. At low powers, the heat sink 300 has the performance of a heat pipe that is very lightly charged. But as the power increases, the charging liquid in the reservoirs is released. The dynamic charging of liquid in the heat pipe 305 in FIGS. 3 and 4 provides much better performance than a heat pipe 105 that does not have reservoirs or valves that provide dynamic charging, as shown in FIG. 1.

Figure 6:
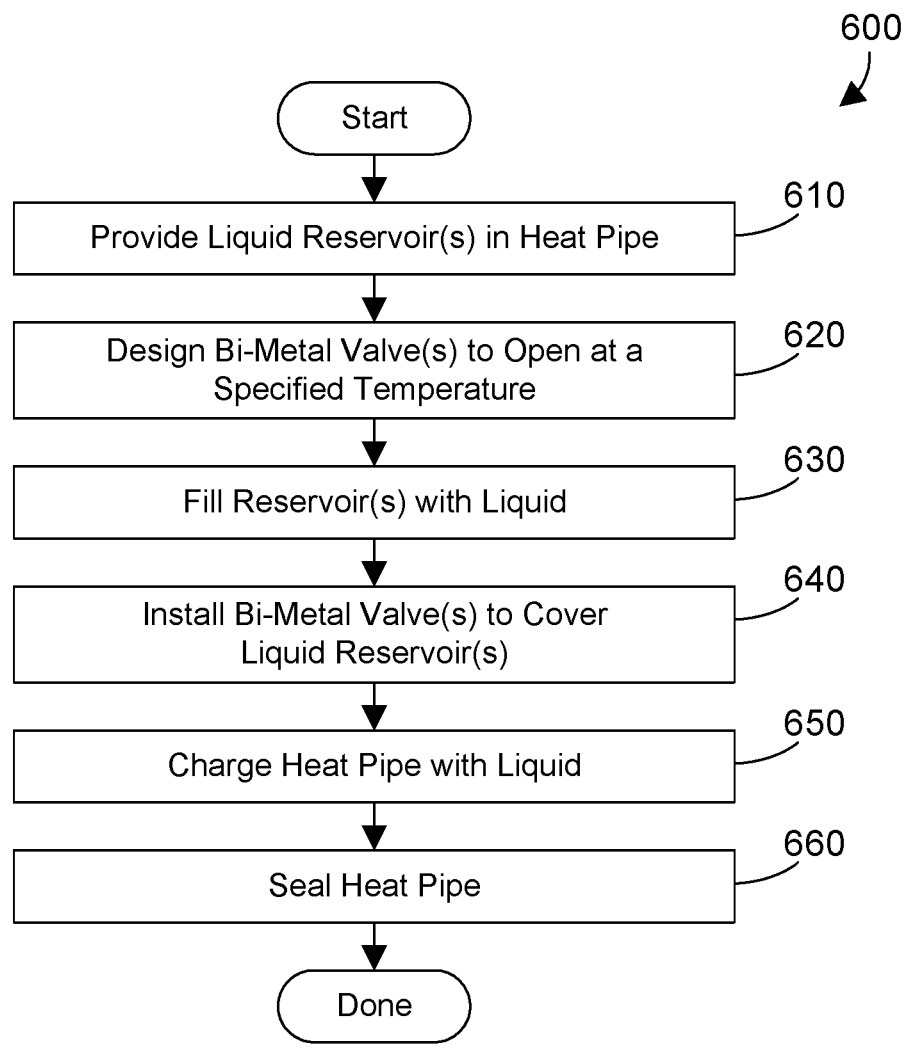
FIG. 6 is a flow diagram of a method for manufacturing a heat pipe.

FIG. 6 shows a method 600 for manufacturing the heat sink 300 shown in FIGS. 3 and 4. Note that many other steps could be included in the manufacturing process, as known in the art. One or more liquid reservoirs are provided in a heat pipe (step 610). One or more bi-metal valves are then designed to open at a specified temperature (step 620). The reservoir(s) are filled with liquid (step 630). The bi-metal valves are installed to cover the liquid reservoirs (step 640). The heat pipe is then charged with liquid (step 650) and sealed (step 660). It is known in the art to evacuate all the air in the heat pipe before sealing. Note the manufacturing process shown in FIG. 6 includes one or more steps that are not performed when manufacturing known heat pipes. The result is a heat pipe with increased thermal performance due to the dynamic charging of liquid in the heat pipe as the temperature of the heat pipe rises.

Figure 7:
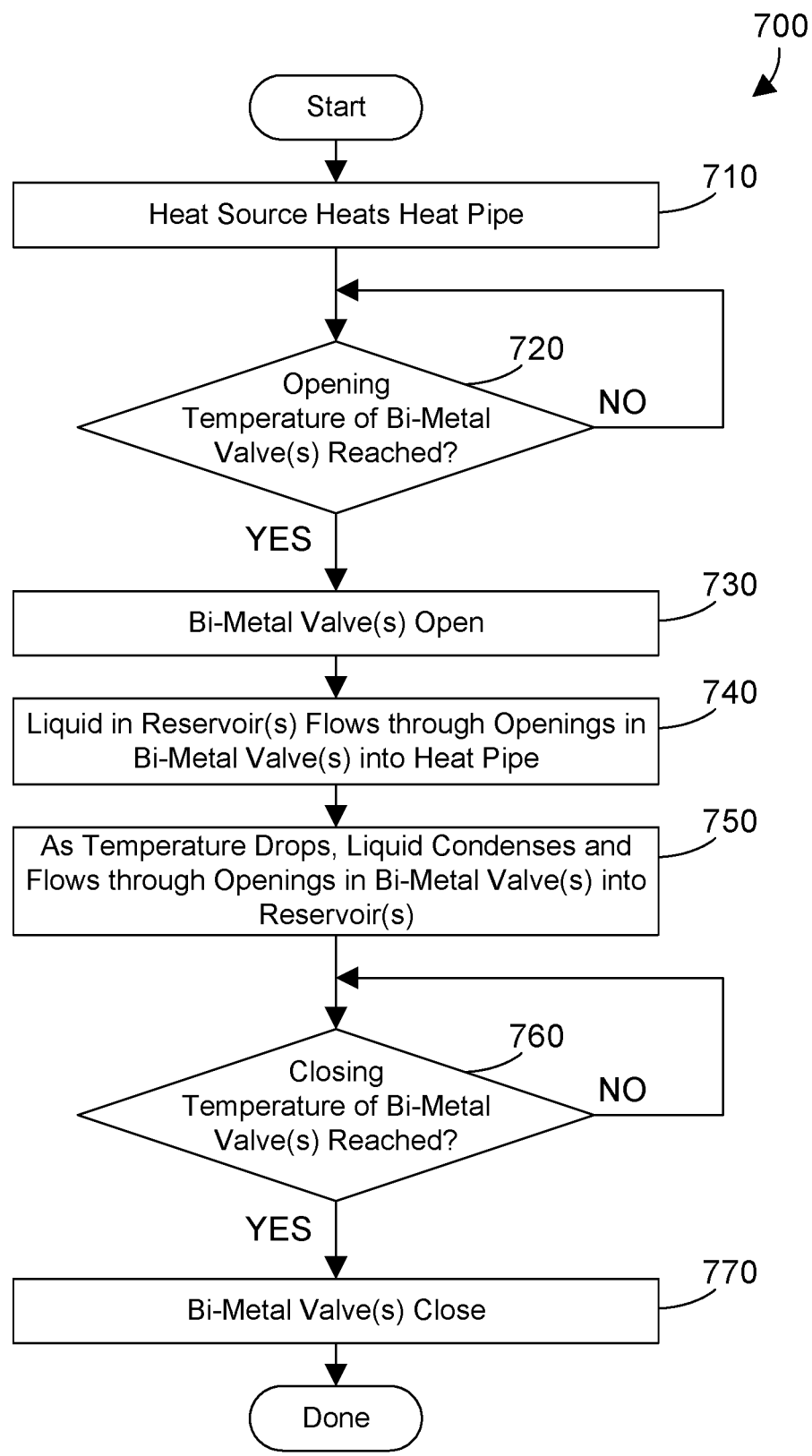
FIG. 7 is a flow diagram of a method for of operation for the heat pipe in FIGS. 3 and 4.

FIG. 7 shows a method 700 that represents how the heat pipe 305 in FIGS. 3 and 4 works. We assume the heat pipe is in the condition shown in FIG. 3 when method 700 initially begins. As long as the temperature of the bi-metal valves is not reached (step 720=NO), method 700 loops back and continues until the opening temperature of the bi-metal valves is reached (step 720=YES). The bi-metal valves open (step 730), as shown in FIG. 4. The liquid in the reservoir(s) flows through the openings in the bi-metal valve(s) into the heat pipe, as shown by arrows 410 and 412 in FIG. 4. As the temperature drops, liquid condenses and flows by the force of gravity through the openings in the bi-metal valve(s) into the reservoir(s). As long as the closing temperature of the bi-metal valves is not reached (step 760=NO), method 700 loops back to step 760 until the closing temperature of the bi-metal valves is reached (step 760=YES). The bi-metal valve(s) close (step 770). Method 700 is then done.

With multiple reservoirs as shown in FIGS. 3 and 4, it is possible to have a first valve open at a first predetermined temperature and a second valve open at a second predetermined temperature different than the first predetermined temperature. The disclosure and claims herein expressly extend to any suitable number of reservoirs with any suitable number of valves that can open at the same temperature or that can open at different temperatures. For example, a heat pipe could include four different reservoirs with four different valves that each has different actuation temperatures.

Any suitable liquid may be used to charge the heat pipe disclosed herein. The suitability of the liquid depends on factors such as the material used to form the heat pipe and the desired performance of the heat pipe. For heat sinks used for integrated circuits, the preferred material for the heat pipe is copper, and the preferred liquid is water.

A heat pipe includes one or more reservoirs of liquid that are closed at lower temperatures and open at higher temperatures. The opening of the reservoirs at higher temperatures caused by higher power levels dynamically increases the amount of liquid in the heat pipe, which increases performance of the heat pipe at higher power levels. As the heat pipe cools, the liquid condenses and flows back into the reservoirs. As the heat pipe continues to cool, the reservoirs close. The result is a heat pipe that is more efficient at lower power levels and still maintains high efficiency at higher power levels due to the demand-based charging of the liquid based on temperature.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A heat pipe comprising:
    a substantially horizontal portion charged with a first quantity of liquid and comprising a substantially horizontal bottom surface that includes a substantially horizontal interface for attaching a heat source;
    a reservoir extending downwardly from the bottom surface of the substantially horizontal portion that contains a second quantity of the liquid; and
    a temperature-actuated valve overlying the reservoir, wherein the temperature-actuated valve seals the second quantity of the liquid in the reservoir when the temperature is below an actuation temperature and unseals the second quantity of liquid in the reservoir when the temperature is above the actuation temperature, wherein the temperature-actuated valve comprises a bi-metal valve that has a first end fixedly attached to an edge of the reservoir with an opposing second end free to move from a first position that seals the reservoir to a second position that unseals the reservoir.

2. The heat pipe of claim 1 wherein, when the temperature is above the actuation temperature, the first and second quantities of the liquid combine to form a third quantity of the liquid that comprises a sum of the first and second quantities of the liquid.

3. The heat pipe of claim 1 wherein the reservoir comprises a valve seat the temperature-actuated valve rests on when the temperature is below the actuation temperature.

4. The heat pipe of claim 1 further comprising at least one vertical member connected with the substantially horizontal portion.

5. The heat pipe of claim 1 further comprising a plurality of fins that dissipate heat.

6. The heat pipe of claim 1 further comprising:
    a second reservoir that contains liquid in the lower portion of the substantially horizontal portion; and
    a second temperature-actuated valve overlying the second reservoir, wherein the second temperature-actuated valve seals the liquid in the second reservoir when the temperature is below a second actuation temperature and unseals the liquid in the second reservoir when the temperature is above the second actuation temperature.

7. The heat pipe of claim 6 wherein the actuation temperature and the second actuation temperature are the same.

8. The heat pipe of claim 6 wherein the actuation temperature and the second actuation temperature are different.

9. The heat pipe of claim 1 wherein the heat pipe is made of copper.

10. The heat pipe of claim 9 wherein the liquid comprises water.

11. The heat sink of claim 1 further comprising two vertical members connected with the substantially horizontal portion to form a U-shape, wherein the reservoir at least partially underlies one of the two vertical members.

12. The heat sink of claim 1 further comprising a second reservoir extending downwardly from the bottom surface of the substantially horizontal portion that contains a third quantity of the liquid, wherein the reservoir and the second reservoir are positioned on opposite sides of the substantially horizontal interface and adjacent to the substantially horizontal interface.

13. A heat sink comprising:
    a plurality of thermally-conductive fins; and
    a heat pipe thermally coupled to the plurality of thermally-conductive fins, the heat pipe comprising:
        a substantially horizontal portion that contains a first quantity of a liquid and comprises a substantially horizontal bottom surface that includes a substantially horizontal interface for attaching a heat source;
        two vertical members connected with the substantially horizontal portion to form a U-shape;
        first and second reservoirs extending downwardly from the bottom surface of the substantially horizontal portion, wherein each of the first and second reservoirs contains liquid and at least partially underlies one of the two vertical members;

a first bi-metal valve overlying the first reservoir, the first bi-metal valve sealing the liquid in the first reservoir when the temperature is below a first actuation temperature and unsealing the liquid in the first reservoir when the temperature is above the first actuation temperature; and a second bi-metal valve overlying the second reservoir, the second bi-metal valve sealing the liquid in the second reservoir when the temperature is below a second actuation temperature and unsealing the liquid in the second reservoir when the temperature is above the second actuation temperature.

14. The heat sink of claim 13 wherein the plurality of thermally-conductive fins dissipate heat.

15. The heat sink of claim 13 wherein the first actuation temperature and the second actuation temperature are the same.

16. The heat sink of claim 13 wherein the heat pipe is made of copper.

17. The heat sink of claim 16 wherein the liquid comprises water.

* * * * *